US010301510B2

(12) United States Patent
Lodde et al.

(10) Patent No.: US 10,301,510 B2
(45) Date of Patent: May 28, 2019

(54) ADHESIVE TAPE, IN PARTICULAR, DOUBLE-SIDED ADHESIVE TAPE, AND USE THEREOF FOR ATTACHING TO NON-POLAR SURFACES (71) Applicant: Coroplast Fritz Müller GmbH & Co. KG, Wuppertal (DE)

(72) Inventors: Christoph Lodde, Holzwickede (DE); Frank Kura, Meerbusch (DE)

(73) Assignee: Coroplast Fritz Müller GmbH & Co. KG, Wuppertal (DE)

(*) Notice: Subject to any disclaimer, the term of this patent is extended or adjusted under 35 U.S.C. 154(b) by 0 days.

(21) Appl. No.: 14/309,059

(22) Filed: Jun. 19, 2014

(65) Prior Publication Data
US 2014/0377543 A1 Dec. 25, 2014

(30) Foreign Application Priority Data
Jun. 24, 2013 (DE) .......................... 10 2013 106 576

(51) Int. Cl.
*C09J 7/02* (2006.01)
*C09J 7/38* (2018.01)
*C08K 3/36* (2006.01)
*C09J 133/06* (2006.01)
*C09J 7/22* (2018.01)
*C08K 7/00* (2006.01)

(52) U.S. Cl.
CPC ........ *C09J 7/38* (2018.01); *C08K 3/36* (2013.01); *C09J 7/22* (2018.01); *C09J 133/06* (2013.01); *C08K 7/00* (2013.01); *C08L 2312/06* (2013.01); *C09J 2205/102* (2013.01); *C09J 2427/006* (2013.01); *C09J 2433/00* (2013.01); *C09J 2467/006* (2013.01); *Y10T 428/259* (2015.01); *Y10T 428/266* (2015.01); *Y10T 428/273* (2015.01); *Y10T 428/2848* (2015.01); *Y10T 428/2891* (2015.01)

(58) Field of Classification Search
None
See application file for complete search history.

(56) References Cited

U.S. PATENT DOCUMENTS

| 3,993,847 | A | * | 11/1976 | Kondo | B32B 25/04 156/124 |
| 4,144,157 | A | * | 3/1979 | Guse | C08F 246/00 428/463 |
| 4,710,536 | A | * | 12/1987 | Klingen | C09J 7/0217 428/308.8 |
| 4,749,590 | A | * | 6/1988 | Klingen | C09J 7/0217 427/208.4 |
| 4,849,278 | A | * | 7/1989 | Stokes | C09J 7/04 428/153 |
| 5,028,484 | A | * | 7/1991 | Martin | C09J 7/0217 428/352 |
| 5,221,497 | A | * | 6/1993 | Watanabe | C01B 33/145 106/287.34 |
| 5,536,759 | A | * | 7/1996 | Ramharack | C09J 133/062 522/116 |
| 5,639,811 | A | * | 6/1997 | Plamthottam | B32B 7/10 428/355 AC |
| 2001/0007003 | A1 | * | 7/2001 | Karim | C09J 7/0203 525/330.5 |
| 2001/0025063 | A1 | * | 9/2001 | Husemann | C08F 220/18 522/153 |
| 2002/0006979 | A1 | * | 1/2002 | Husemann | C08F 220/18 522/34 |
| 2003/0105258 | A1 | * | 6/2003 | Husemann | C08F 220/12 526/319 |
| 2004/0048944 | A1 | * | 3/2004 | Cartellieri | C08F 8/00 522/113 |
| 2004/0235978 | A1 | * | 11/2004 | Husemann | C09J 133/04 522/83 |

(Continued)

FOREIGN PATENT DOCUMENTS

DE 10208843 A1 9/2003
DE 10323048 A1 12/2004

(Continued)

OTHER PUBLICATIONS

Data sheet Aerosil R972 from Evonik Industries, Sep. 5, 2015.*
Christoph Lodde et al., "Technical Adhesive Tape and Process for Its Production", English translation of EP 1548080 A1, Jun. 29, 2005.*
Brief History of Gluing, Mounting Tape, The 3M Adhesive Profile "The Glueprofi," Specialized Information on Gluing 3M (5 pages), Nov. 18, 2015 (oldest German version available at https://web.archive.org/web/20151118163956/https://www.klebeprofi.net/klebebaender/montageklebeband/).

(Continued)

*Primary Examiner* — Anish P Desai
(74) *Attorney, Agent, or Firm* — Brinks Gilson & Lione (57) ABSTRACT

An adhesive tape (1), in particular a double-sided adhesive tape has a substrate made of plastic with a self-adhesive, pressure-sensitive layer (3) consisting of a pressure-sensitive adhesive containing a UV-crosslinkable acrylate as primary constituent. In order to achieve an at least moderate, preferably increased adhesive force on nonpolar surfaces (4a) as well as preferably an increased shear strength, while preserving the advantages of the use of UV-crosslinkable acrylates in the adhesive coating and ensuring an at least moderate, preferably increased adhesive force on steel, the pressure-sensitive adhesive contains powdered silicon dioxide, wherein the substrate (2) made of plastic is configured as a film. The pressure-sensitive adhesive is modified with tackifying resins, such as pinene, indene and/or colophonium resins, their disproportioned, hydrated, polymerized, esterified derivates and/or salts and/or terpene and/or terpene phenol resins and/or aliphatic, aromatic, alkyl aromatic hydrocarbon resins, and/or with one or several C5- to C9-hydrocarbon resin(s).

17 Claims, 1 Drawing Sheet

(56) References Cited

U.S. PATENT DOCUMENTS

| | | | | |
|---|---|---|---|---|
| 2004/0249186 A1* | 12/2004 | Balzer | ............ | C08F 2/50 |
| | | | | 560/26 |
| 2004/0266905 A1 | 12/2004 | Baumgart et al. | | |
| 2005/0182150 A1* | 8/2005 | Bamborough | ............ | C09J 4/00 |
| | | | | 522/109 |
| 2006/0088031 A1* | 4/2006 | Nalawade | ............ | H04L 12/185 |
| | | | | 370/390 |
| 2007/0213449 A1* | 9/2007 | Lewandowski | ........ | C09J 133/14 |
| | | | | 524/493 |
| 2012/0028020 A1* | 2/2012 | Utesch | ............ | C08G 18/10 |
| | | | | 428/220 |

FOREIGN PATENT DOCUMENTS

| | | |
|---|---|---|
| EP | 1181987 A2 | 2/2002 |
| EP | 1262532 A1 | 12/2002 |
| EP | 1300427 A1 | 4/2003 |
| EP | 2551102 A1 | 1/2013 |
| WO | 2005044940 A1 | 5/2005 |
| WO | 2006/065373 A1 | 6/2006 |
| WO | WO 2010100025 A1 * | 9/2010 ............ C08G 18/10 |

OTHER PUBLICATIONS

Wikipedia, "Parts Per Hundred Rubber" and Recipe Example of a Rubber Mixture, 1 page.

Product Information: Aerosil R 972, Hydrophobic Fumed Silica, Evonik Resource Efficiency GmbH, Feb. 2016, 2 pages.

"Hostaphan RN 36-350" Universal Film, Mitsubishi Polyester Film, Kasteler Str. 45, D-65203 Wiesbaden, Germany, Edition 07/08, 4 pages.

* cited by examiner

ADHESIVE TAPE, IN PARTICULAR, DOUBLE-SIDED ADHESIVE TAPE, AND USE THEREOF FOR ATTACHING TO NON-POLAR SURFACES

CROSS-REFERENCE TO RELATED APPLICATIONS

The present application claims priority to German Patent Application 10 2013 106 576.7, filed on Jun. 24, 2013, the disclosure of which is herewith incorporated by reference in its entirety.

TECHNICAL FIELD OF THE INVENTION

The invention relates to an adhesive tape, in particular a double-sided adhesive tape, with a substrate made of plastic, which is provided on at least one side with a self-adhesive film consisting of a pressure-sensitive adhesive comprising a UV-crosslinkable acrylate as primary constituent.

BACKGROUND OF THE INVENTION

An adhesive tape of the kind mentioned above is known from DE 103 12 031 A1. This document describes a decidedly flame retardant pressure-sensitive adhesive compound comprising at least one acrylate adhesive component, at least one ammonium polyphosphate component, and at least one resin component. The known pressure-sensitive adhesive compound is preferably composed of at least 35% by weight of acrylate adhesive component, at least 25% by weight of ammonium polyphosphate, in particular 30 to 40% by weight, and also at least 25% by weight of resin component. The presence of the ammonium polyphosphate component is primarily responsible for the inhibition of the flammability of the pressure-sensitive adhesive compound known from DE 103 12 031 A1.

The production of double-sided adhesive tapes is also described in DE 103 12 031 A1, wherein the application in the hot-melt method was carried out exclusively on textiles, substrates made from plastic fibers, such as on nonwoven fabrics, in particular PET nonwoven fabrics, woven fabrics or so-called nonwoven geotextiles. A multitude of suitable composites are described for the acrylate adhesive component, wherein this component can be preferably produced by copolymerization of different co-monomers. In a preferred embodiment of the pressure-sensitive adhesive compound, it is provided that at least one co-monomer is a photoinitiator with a copolymerizable double bond. Photoreactive groups incorporated by polymerization facilitate the possibility of a reaction of the chain with neighboring chains upon exposure to ultraviolet radiation, so that a crosslinking structure is created such as those that are typical for adhesives, in particular for pressure-sensitive adhesives with UV-crosslinkable acrylate as main component.

One key parameter for an adhesive tape is its adhesive force, which may require different magnitudes according to the particular application. Standard methods are frequently used to determine this parameter, such as, for example, the determination of the adhesive force on steel according to DIN EN 1939 (status 2003). The adhesive force on steel was also determined according to DE 103 12 031 A1, but according to a non-standardized special method, which is described in the mentioned document. The adhesive force on steel determined in this way was within the range of 8.0 N/cm to 8.7 N/cm for various embodiments described as examples. These values were assessed in the document as being an improvement of the adhesive force with respect to conventional adhesive compounds.

Under "moderate adhesive force" is understood according to DIN EN 1939 an adhesive force within the range of 0.5 N/cm to 4.0 N/cm; under "increased adhesive force" is understood according to DIN EN 1939 an adhesive force within the range of 4.0 N/cm to 10.0 N/cm. A differentiated adhesive force such as this plays an important role in particular when dealing with the bonding of nonpolar surfaces.

Another key parameter for an adhesive tape is its shear strength. High values are required for the shear strength, in particular where an adhesive tape is designed as a double-sided adhesive tape intended for bonding together different components, wherein standard methods are likewise often used to determine said values, such as, for example, the determination of shear strength according to DIN EN 1943 (status 2002).

Under "moderate shear strength" is understood according to the application a shear strength within the range of 100 minutes to 1,000 minutes according to DIN EN 1943. Under "increased shear strength" is understood a shear strength within the range of 1,000 minutes to 10,000 minutes according to DIN EN 1943. Under "very high shear strength range" are understood values greater than 10,000 minutes, wherein the exact end of the measurement as a rule cannot be ascertained.

SUMMARY OF THE INVENTION

It is an object of the invention to create an adhesive tape of the initially mentioned kind which, while preserving the advantages of the use of UV-crosslinkable acrylates in the adhesive coating and ensuring an at least moderate, preferably increased adhesive force on steel, also displays an at least moderate, preferably increased adhesive force on nonpolar surfaces as well as preferably an increased shear strength.

Under "nonpolar" or "apolar" surface is understood according to the application a surface formed from substances that do not have a permanent dipole moment. A dipole moment is produced in a molecule, on the one hand from the electronegativity difference of the mutually bonded atoms, which defines the bonding polarity, and on the other hand from the symmetry of the molecule. The latter can again entirely cancel out the dipole character of highly polar chemical bonds in the molecule, for example, in polytetrafluoroethylene (PTFE). Aliphatic surfaces, such as those of polyethylene or polypropylene, which can be more difficult to bond with conventional adhesive tapes than surfaces in which dipole molecules are located, are of particular technical importance for the range of applications of the adhesive tapes according to the invention.

Steel cannot be interpreted as a nonpolar surface due to the existing metallic bonds, which are characterized by the presence of free electrons. Adhesive force values determined on steel are therefore not representative of adhesive forces occurring on apolar surfaces, and technical measures for increasing the adhesive force on steel cannot be directly transferred to an increase of adhesive force on apolar surfaces.

The object of the invention is attained in that the pressure-sensitive adhesive contains powdered nanoscale silicon dioxide, wherein the substrate made of plastic is configured as a film.

Under the term "film" is understood within the scope of the application—as well as also with regard to its general meaning—a very thin, especially band-shaped sheet, wherein the substrate can have in particular a thickness within the range of 0.005 mm to 0.5 mm, preferably within the range of 0.01 mm to 0.3 mm. A continuous, uninterrupted, consistent adhesive surface is thus advantageously configured in contrast to the textile substrates known from the prior art considered above. The substrate can preferably be made from polyvinylchloride or polyester, which can be easily processed to films coated with the adhesive coating also on both sides. Any adhesive film with a specific surface weight of about 10 g/m2 to 150 g/m2, preferably about 20 g/m2 to 100 g/m2, can be applied onto the substrate.

Under the term "nanoscale" are subsumed according to the application magnitude ranges up to a diameter of the SiO2-powder particles of a maximum 1000 nm. An average particle size of the powdered silicon dioxide can be (especially with a unimodal standard distribution of particle sizes) in particular within the range of 5 nm to 250 nm, preferably within the range of 10 nm to 80 nm.

Different methods are commonly used to determine the size of nanoscale particles. One such method is, for example, the determination of the average particle size in dispersion, as described, for example, in the literature reference entitled "The Ultimate in Desktop Particle Characterization," Malvern Instruments Publisher, published in the year 2003, and "Particle Size Measurement" by T. Allen, 4th edition 1992, ISBN 04123570 and 5th Edition, 1997, ISBN 0412729504. Other comparable and customary measurement methods can also be used, however, to determine the particle size, for example, "Dynamic Light Scattering (DLS)" (Dr. Michael Kaszuba & Dr. Kevin Mattison "High Concentration Particle Size Measurements using Dynamic Light Scattering," Lab Plus International—September 2004, and Dahneke, B. E. "Measurement of Suspended Particles by Quasi-elastic Light Scattering," 1983, Wiley). The results of the different customary measurement methods differ, however, so little from each other that the corresponding differences are of no relevance to the invention.

Powdered silicon dioxide having a BET-surface area within the range of 50 m2/g to 500 m2/g, preferably within the range of 80 m2/g to 200 m2/g, is considered to be particularly suitable. The BET surface area is determined within the scope of a BET measurement (BET stands for Brunauer, Emmett and Teller, the creators of the method), which is a method of analysis for size determination of the surface area of porous solid bodies by means of gas adsorption. This method is carried out according to the standard DIN ISO 9277:2003-05 "Determination of the Specific Surface Area of Solids by Means of Gas Adsorption using the BET Method" (ISO 9277:1995). The BET surface area and the average grain size of the silicon dioxide particles in the powder have contrary behaviors, wherein the BET surface area increases disproportionately when the particle size becomes smaller.

The powdered nanoscale silicon dioxide can preferably be one pyrogenically produced from volatile chlorosilanes, such as silicon tetrachloride SiCl4, in an oxyhydrogen gas flame or by atomizing quartz sand in an electric arc. In practice it is also frequently known as "pyrogenic silicic acid" (or fumed silica). From the chemical point of view, "pyrogenic silicic acid" consists of highly pure amorphous silicon dioxide. It is then strictly speaking not an acid, even though it has an acidic reaction in water, but rather an acid anhydride. Silicon dioxide powder produced in this manner has the appearance of a loose white powder.

The powdered nanoscale silicon dioxide that can be used as adhesive component according to the invention is commercially available under the brand names Aerosil® of Evonik Industries, Cab-O-Sil® of the Cabot Corporation, or HDK®-pyrogenic silicic acid of Wacker Chemie. These products are commonly used in the manufacture of silicone sealing compounds used, for example, in bathrooms and in automobile lacquers as well as ship paints. The pyrogenic oxide causes, inter alia, a thixotropic effect, low moisture absorption, mechanical strength and the optimization of the rheological properties, such as the thickening of fats and oils. Pyrogenic oxides are also commonly used, for example, in the cosmetics industry, for instance, in lipsticks, creams and deodorants and in the electronics industry.

It was surprisingly discovered according to the invention that the shear strength of the adhesive tape can be increased to an extremely high level at high temperatures without a loss of adhesive force of said adhesive tape. According to the invention, a shear strength measured according to DIN EN 1943 at 70° C., for example, typically has a value of more than 10,000 minutes after a dwell time of 15 minutes, which still exceeds the range of the above-mentioned increased shear strength (1,000 minutes to 10,000 minutes) and thus represents a very high shear strength according to the basic definitions.

The content of silicon dioxide, in particular the content of pyrogenic silicic acid, can be within the range of 1 phr to 20 phr, preferably within the range of 2 to 10 phr, with reference to the UV-crosslinkable acrylate. Even minor fractions of the silicon dioxide produce a very powerful effect on the substrate in combination with the UV-crosslinkable acrylate.

Hydrophilic pyrogenically produced silicon dioxide is wetted with water and can be readily dispersed in water and—as is important to the invention—in the non-aqueous, UV-crosslinking acrylate used as pressure-sensitive adhesive.

The latter also applies, however, to hydrophobic silicon dioxide or to silicon dioxide made hydrophobic by means of a surface treatment, so that it can also be used advantageously within the scope of the invention. A hydrophobizing such as this can even promote the adhesive bonding of the silicon dioxide particles in the acrylate or polyacrylate material—including in the resins eventually present therein—if carried out with organosilanes, such as, for example, dimethyldichlorosilane, hexamethyldisilazane, methacryloxypropyltrimethoxysilane, octyl trimethoxy silane, polysiloxane, hexadecyltrimethoxysilane, and has a crosslinking promoting action, in that the hydrophobic surface layer of the silicon dioxide particles is chemically incorporated in the molecular structure of the polyacrylates that form during the UV crosslinking.

As far as the adhesive coating is concerned, solvent-free UV-crosslinkable acrylate adhesives are used as pressure-sensitive adhesives according to the invention. This contributes to the fact that the invented adhesive tape is characterized by a high resistance to the influence of various chemicals, an exceptionally high resistance to aging processes, and an excellent compatibility with various components to be bonded, in particular also to nonpolar surfaces.

UV-crosslinking adhesives such as these are marketed, for example, in various types of embodiments under the name acResin® of BASF. They can be processed at temperatures of 120° C. on conventional hot melt coaters, which are additionally equipped with UV lamps. No special drying systems are needed. An adhesive coating based on such pressure-sensitive compounds exhibits only a low evaporation of volatile substances, which can be determined by means of the so-called fogging test, due to the minimal quantity of migration-capable constituents contained therein. According to manufacturer's data, the polymer chains of acResin® UV-acrylates are produced from the same acrylate monomers that are also used in the conventional pressure-sensitive adhesive systems based on the solvent or dispersion. A UV-C-reactive group incorporated by polymerization is stimulated to enter into a crosslinking reaction with a neighboring acrylate chain upon exposure to UV-C-light (250 nm-260 nm) from commercial UV-emitters or lamps. The UV-crosslinking proceeds extremely quickly, can be accurately controlled, and takes place only as long as the UV-light is provided. The photoreactive group incorporated by polymerization into the side chain of the acResin® UV-polymer reacts with a desired C—H-group of a neighboring chain. Especially activated bonds or even double bonds are not needed. Contrary to UV-hardening with admixed photoinitiators, no migration-capable residual constituents appear as a result of the chemical bonding of the UV-C-photo reactive group to the polymer chain. The degree of crosslinking of the acrylate polymer increases and the pressure-sensitive adhesive increases in cohesion with an increasing UV-C-irradiation of the pressure-sensitive adhesive film. Adhesion and tack are reduced at the same time. However, if a double-sided adhesive tape is produced with this kind of standard acResin-Adhesive® without the additive according to the invention, then the attainable high values of shear strength and adhesive force attainable according to the invention will also not be achieved, especially on nonpolar surfaces, as will be explained in greater detail below with the aid of comparative examples.

It can be advantageously provided according to the invention to modify the pressure-sensitive adhesive of the self-adhesive layer by adding softeners, acrylate comonomers and/or polyvinyl ethers, as well as in particular resins in order to improve the properties.

There are a multitude of adhesive resins, of which it is known that they can be added to solvent-based acrylate adhesive coatings, and which are considered as property enhancing. As representatives of such resins should be mentioned pinene, indene and colophonium resins, their disproportioned, hydrated, polymerized, esterified derivates and salts, aliphatic and aromatic hydrocarbon resins, terpene resins and terpene phenolic resins, as well as C5- to C9-hydrocarbon resins. Also combinations of these and further aliphatic, aromatic and/or alkyl aromatic resins compatible with the corresponding polyacrylate can be added in order to influence at will the properties of the resulting adhesive compound.

It has been shown that the aforementioned acResin® UV-products can likewise be basically mixed with such resins in order to increase, for example, the adhesive force of the adhesive film. However, there is the possible disadvantage that the resin will, because of its nature, absorb more or less of the UV-radiation intended for crosslinking, so that the radiation will no longer be available in a sufficient quantity for crosslinking the acrylate, unless the UV-C-dosage is increased. The modification of the acResin® UV-acrylate with resin leads also to a disadvantageous dilution of the UV-C-reactive groups contained therein, which must likewise be compensated by means of a higher UV-C-dosage in order to establish the same crosslinking density as in an adhesive film, which was not modified with resin. These phenomena can be counteracted by setting the resin content relative to the UV-crosslinking acrylate within a preferred range of only 2 phr to 10 phr, but wherein basically a resin content within the range of 1 phr to 50 phr is possible.

In the embodiments preferred according to the invention, in particular an aliphatic C5-resin (Escorez 1304 of the Exxon Company), a hydrated colophonium ester resin (Foral 105 of the Eastman Company) and an aromatic C8/C9-hydrocarbon resin (Kristalex F 100 of the Eastman Company) are seen as being particularly suitable for achieving an additional increase in adhesive force, in particular on non-polar surfaces, by means of their compounding with the UV-crosslinking acrylate while simultaneously ensuring the high values of shear strength attainable according to the invention.

Because the admixture of resins of the aforementioned kind was indeed inherently known as a result of this for aqueous acrylate adhesive formulations, but their effect of increasing the adhesive force, specifically on apolar surfaces of self-adhesive adhesive layers based on the basis of pressure-sensitive solvent-free adhesives containing as their primary component a UV-crosslinkable acrylate, in particular with photoinitiator incorporated therein by polymerization, had not been discerned in the technical world and was surprising for the person of ordinary skill, an independent inventive importance is therefore also attributed to an adhesive tape of the aforementioned kind, which does not contain a powdered nanoscale silicon dioxide in the pressure-sensitive adhesive, but has a film substrate made of plastic and contains said resins, in particular in quantities remaining within the cited preferred range.

The UV-C-dosage, which should be within the range of 5 mJ/cm2 to 135 mJ/cm2, preferably within the range of 5 mJ/cm2 to 80 mJ/cm2, with an adhesive application within the range of 20 g/m2 to 100 g/m2, preferably an adhesive application within the range of 35 g/m2 to 100 g/m2, can be controlled by means of a total of five parameters.

These parameters are:

a) The UV lamp type (doped UV lamps and undoped UV lamps)

b) The reflector type and model in the UV lamps c) The number of UV lamps which are connected in series in order to obtain the greatest possible production speeds d) The geometry of the UV status unit, in particular the distance of the UV lamps to the coating path e) The coating speed or the speed at which the adhesive film passes under the UV emitter unit, which results therefrom As far as the parameters mentioned under (a) are concerned, the radiation dosage can be influenced by the type and power output of the used UV lamps, wherein the emission spectrum of these lamps, in particular within the wavelength range between 250 nm and 260 nm (UV-C-portion) is of particular importance in order to achieve the greatest possible, and thus the most cost-efficient, UV crosslinking yield. The UV-C-portion of commercially available UV lamps is generally greater the greater the radiation power of the lamp is. For example, a lamp with 200 W/cm power output is more economical than a comparable unit with 120 W/cm, since comparable crosslinking densities can be obtained in a clearly shorter time, that is, at a higher passage speed of the adhesive film under the UV emitter unit. Reflector systems of IST Metz GmbH (with so-called CMK and URS® reflectors, wherein the abbreviation CM stands for "Cold Mirror") or cold light reflectors of the Dr. Hoenle AG Company, for example, can be used. The special characteristic of such reflectors is that they reflect the UV radiation and transmit the IR thermal radiation, in particular onto a water-cooled absorber profile, where they can be effectively shunted away, or into a special absorber film. A gentle processing of heat-sensitive materials is promoted in this way.

In addition to the adhesive force on steel, which is not reduced according to the invention and is also characteristic of adhesive tapes different from those of the invention, which is measured according to DIN EN 1939 after a dwell time of 10 minutes and/or after a dwell time of 24 hours can be within the range of 6.0 to 18.0 N/cm, preferably within the range of 7.0 to 15.0 N/cm, the shear strength can also be measured according to DIN EN 1943 according to the invention after a dwell time of 15 minutes, both at room temperature and also at 70° C., and is within the range of 250 minutes to 10,000 minutes, and can exceed 10,000 minutes, as already indicated, wherein the adhesive force on nonpolar surfaces, such as polyethylene or polypropylene surfaces, measured according to DIN EN 1939 after a dwell time of 10 minutes and/or after a dwell time of 24 hours amounts to at least 2.0 N/cm and is preferably within a range of more than 3.0 N/cm, wherein it reach peak values of up to 10.0 N/cm, in particular when the aforementioned additional resin modification of the UV crosslinkable acrylate is carried out.

Further advantageous embodiments of the invention are disclosed in the dependent claims and in the following special description. The invention will be described in greater detail on the basis of several exemplary embodiments and comparative examples and with reference to the FIGURE.

DETAILED DESCRIPTION OF THE DRAWINGS

Figure 1:
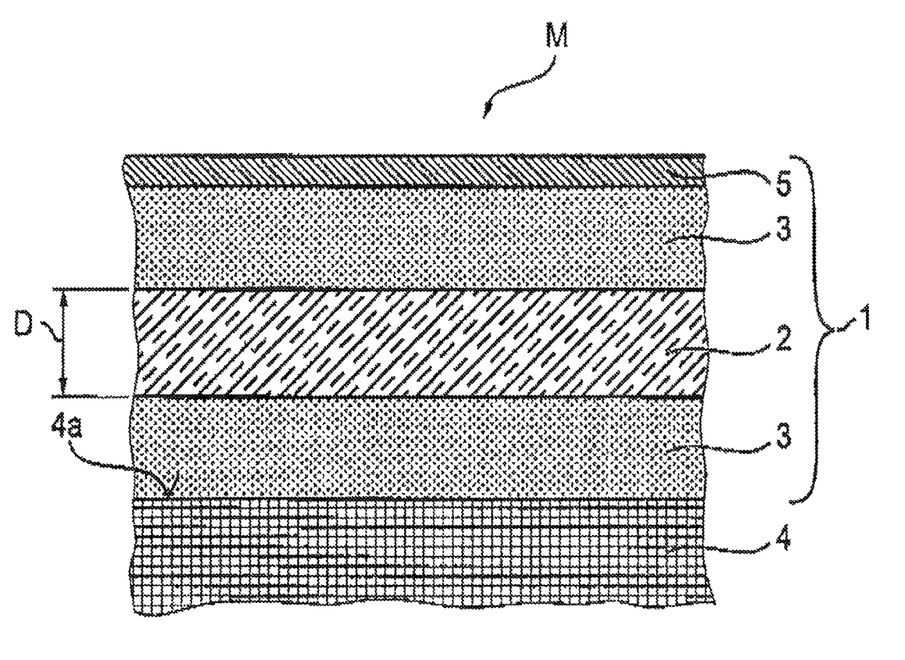
FIG. 1 shows a schematic perspective cross section through an adhesive tape according to the invention, which is bonded to a component, whereby a preassembled assembly unit is formed.

As can be seen in FIG. 1, an adhesive tape 1 according to the invention, which is configured as a double-sided adhesive tape 1 in a preferred embodiment, comprises an especially tape-shaped substrate 2 made of plastic, which is provided at least on one side—on both sides in the depicted embodiment—with a pressure-sensitive adhesive film 3. Each adhesive film 3 consists of a pressure-sensitive adhesive containing a UV-crosslinking acrylate as its main component.

The substrate 2 can preferably be consist of a polyvinylchloride or polyester film and has a thickness D within the range of 0.005 mm to 0.5 mm, preferably within the range of 0.1 mm to 0.3 mm.

The adhesive tape 1 according to the invention can be bonded via the adhesive films 3—to one component 4, as illustrated—or preferably also to several components 4. Thus a preassembled assembly unit M is produced.

In the upper portion of the depicted representation is shown as an example that the/each adhesive film 3 can be covered with a so-called interliner 5 made especially of silicone or silicone-coated paper, which makes possible for the adhesive tape 1 to be wound up onto itself without sticking during manufacture. These interliners can have either a film basis or paper basis and are provided on both sides with a silicone film based on a so-called Easy-Release and/or a CR-coating (controlled release). A corresponding selection of the Interliner with the desired silicone combination can be made here in dependence upon the coating method and/or application method.

The adhesive tape 1 according to the invention can be advantageously used for continuous or intermittent bonding of parts or for providing self-adhesive features to profiles, channels, mirrors, displays, signs, scales, housings as well as for ornamental, decorative veneers, and lining and retaining parts, having especially nonpolar surfaces 4a, such as, for example, polyethylene (PE) or polypropylene (PP) surfaces 4a. The possible use of an adhesive tape 1 according to the invention is not limited to these materials, but the adhesive tape 1 can be used as an assembly adhesive tape—for example, in the furniture industry—also for bonding wooden parts or—for example, in the automobile manufacture—for bonding metal parts or films. A first component 4 of a first material can thus be advantageously bonded to the one side, and a second component 4 made of a second material different from the first material can be bonded to the other side.

The substrate 2 is provided with a coating of pressure-sensitive adhesives having different compositions in the adhesive layer 3 in order to produce the adhesive tape 1 according to the invention. A direct coating onto the substrate material or a transfer coating, in which the adhesive is first applied onto a siliconized paper and subsequently transferred onto the substrate 2, can be used as coating type.

Adhesive tapes 1 produced with the formulations A and B were mentioned in Table 1 as comparative examples for the adhesive film 3. The adhesive application amounted consistently to 60 g/m2. Two different values—once at 45 mJ/cm2 and once at 60 mJ/cm2—were used, however, for the UV-C-dosage provided for the crosslinking.

TABLE 1

| Formulations for the Comparative Examples | | | |
|---|---|---|---|
| Formulation Component | Unit | Formulation A | Formulation B |
| AcResin ® 250 | phr | 100 | 0 |
| AcResin ® 260 | phr | 0 | 100 |

The two UV-crosslinkable acrylates AcResin® 250 and AcResin® 260 contained in Table 1 and also in the following tables are products of the BASF Company with photo initiators incorporated by polymerization, as described above. The specifications 250 and 260 relate to the preferred optimum wavelength in nanometers at which a maximum crosslinking of the mentioned prepolymers is obtained. Both products have a content of non-volatile components of more than 99 percent by weight when determined at 130° C. over a test period of 30 minutes. The so-called K value—determined according to DIN ISO 1628-1 in one-percent tetrahydrofurane solution—is within the range of 48 to 52, the density is 1.06 g/cm3, the glass transition temperature determined according to the DSC method is at ~38° C. The viscosity at 130° C. measured according to EN ISO 3219, Appendix B, on the cone-plate viscometer at a shear speed of 100 RPM is within the range of 30 Pas to 70 Pas.

The adhesive tapes 1 equipped with the adhesive films 3 produced in this manner achieved only the adhesive forces and shear strengths presented in Tables 2a and 2b. It can be deduced from this that the adhesives that were not UV-crosslinked according to the invention were not able to raise the shear strength at 70° C. to more than a value of 800 minutes by means of an increase in the UV dosage, since the cohesion of the UV-crosslinkable AcResin®-adhesive cannot be further increased by means of increased UV-C-doses.

TABLE 2a

Adhesive Forces and Shear Strengths of the Comparative Examples (Low UV-C-Dose)

| Test | Test Method | Dwell Time | Unit | Formulation A | Formulation B |
|---|---|---|---|---|---|
| Adhesive application | | | g/m² | 60 | 60 |
| UV-C-dosage | | | mJ/cm² | 45 | 45 |
| Adhesive force on steel | DIN EN 1939 | 10 min<br>24 h | N/cm | 10<br>12 | 8<br>8 |
| Adhesive force on PE | DIN EN 1939 | 10 min<br>24 h | N/cm | 1.5<br>2.5 | 1.0<br>1.0 |
| Adhesive force on PP | DIN EN 1939 | 10 min<br>24 h | N/cm | 3.5<br>3.5 | 1.5<br>1.5 |
| Shear strength RT | DIN EN 1943 | 15 min | Min | >10,000 | >10,000 |
| Shear strength at 70° C. | DIN EN 1943 | 15 min | Min | 250 | 500 |

TABLE 2b

Adhesive Forces and Shear Strengths of the Comparative Examples (High UV-C-Dose)

| Test | Test Method | Dwell Time | Unit | Formulation A | Formulation B |
|---|---|---|---|---|---|
| Adhesive application | | | g/m² | 60 | 60 |
| UV-C-dosage | | | mJ/cm² | 65 | 65 |
| Adhesive force on steel | DIN EN 1939 | 10 min<br>24 h | N/cm | 10<br>12 | 7<br>8 |
| Adhesive force on PE | DIN EN 1939 | 10 min<br>24 h | N/cm | 1.5<br>2.5 | 1.0<br>1.0 |
| Adhesive force on PP | DIN EN 1939 | 10 min<br>24 h | N/cm | 1.5<br>2.5 | 1.5<br>1.5 |
| Shear strength RT | DIN EN 1943 | 15 min | Min | >10,000 | >10,000 |
| Shear strength at 70° C. | DIN EN 1943 | 15 min | Min | 250 | 800 |

Adhesive tapes 1 with the formulations 1 and 2 mentioned in Table 3 for the adhesive films 3 were produced according to the invention. The adhesive application amounted again to consistently 60 g/m². A value of 60 mJ/m² was used as UV-C-dosage for crosslinking.

TABLE 3

UV-Acrylate Formulations with Pyrogenic Silicic Acid (Without Resin)

| Formulation Component | Unit | Formulation 1 | Formulation 2 |
|---|---|---|---|
| AcResin ® 250 | phr | 100 | 0 |
| AcResin ® 260 | phr | 0 | 100 |
| Aerosil ® R 972 | Phr | 5 | 5 |

The Aerosil® R 972 contained in Table 3 is a commercially available pyrogenic silicic acid of Evonik Industries hydrophobized with DDS (dimethyldichlorosilane) and having a BET surface area of 110±20 m2/g and a pH-value in water of 4.0±0.4, as well as a carbon content of 0.9±0.3 percent by weight.

The adhesive forces and shear strengths presented in Table 4 were achieved for the adhesive tapes 1 equipped with the adhesive films 3 produced in this manner.

The high shear strength at 70° C. of over 10,000 minutes of Table 4 in a comparison to the values of the comparative examples in Table 2b should be especially emphasized.

Adhesive tapes 1 with the formulations 3 and 4a to 4c listed in Table 5 for the adhesive films 3 were then produced. An inventive importance is likewise ascribed to these adhesive tapes 1, which contain no pyrogenic silicic acid, as discussed above. The application of adhesive was again a consistent 60 g/m2. A value of 60 mJ/m2 was used as UV-C-dosage for crosslinking.

TABLE 4

Adhesive Forces and Shear Strengths of Adhesive Tapes 1 with Adhesive Films 3 Using Formulations 1 and 2 (High UV-C-Dose)

| Test | Test Method | Dwell Time | Unit | Formulation 1 | Formulation 2 |
|---|---|---|---|---|---|
| Adhesive application | | | g/m² | 60 | 60 |
| UV-C-dosage | | | mJ/cm² | 65 | 65 |
| Adhesive force on steel | DIN EN 1939 | 10 min<br>24 h | N/cm | 10<br>12 | 8.5<br>9.0 |
| Adhesive force on PE | DIN EN 1939 | 10 min<br>24 h | N/cm | 2.0<br>2.5 | 0.5<br>0.5 |
| Adhesive force on PP | DIN EN 1939 | 10 min<br>24 h | N/cm | 0.5<br>0.5 | 0.5<br>0.5 |
| Shear strength RT | DIN EN 1943 | 15 min | Min | >10,000 | >10,000 |
| Shear strength at 70° C. | DIN EN 1943 | 15 min | Min | >10,000 | >10,000 |

TABLE 5

UV-Acrylate Formulations with Resin (Without Pyrogenic Silicic Acid)

| Formulation Component | Unit | Formulation 3 | Formulation 4a | Formulation 4b | Formulation 4c |
|---|---|---|---|---|---|
| AcResin ® 250 | phr | 100 | 0 | 0 | 0 |
| AcResin ® 260 | phr | 0 | 100 | 100 | 100 |
| Aerosil ® R 972 | phr | 0 | 0 | 0 | 0 |
| Escorez 1304 | phr | 5 | 5 | 0 | 0 |
| Foral 105 | phr | 0 | 0 | 5 | 0 |
| Kristalex F 100 | phr | 0 | 0 | 0 | 5 |

The origin and chemical nature of the resins Escorez 1304, Foral 105 and Kristalex F 100 listed in Table 5 were already defined above.

The adhesive tapes 1 equipped with the adhesive films 3 produced in this manner according to the invention achieved the adhesive forces and shear strengths presented in Tables 6a and 6b. The adhesive force of Tables 6a and 6b, which was increased to 2.5 N/cm and more on the nonpolar polyolefin surfaces polyethylene (PE) and polypropylene (PP) with respect to the values from the comparative examples of Table 2b, should be especially emphasized. A noticeable loss of shear strength is observed for the resin modification measured according to DIN EN 1943 with reference to the comparison between formulation 1 and formulation 3 at 70° C. A similar shear resistance loss is also observed between the formulation 2 as basic formulation and the formulation 4a at 70° C. measured according to DIN EN 1943, since resins have likewise been added in formulation 4a.

TABLE 6a

Adhesive Forces and Shear Strengths of Adhesive Tapes 1 with Adhesive Films 3 Using Formulations 3 and 4a (High UV-C-Dose)

| Test | Test Method | Dwell Time | Unit | Formulation 3 | Formulation 4a |
|---|---|---|---|---|---|
| Adhesive application | | | g/m² | 60 | 60 |
| UV-C-dosage | | | mJ/cm² | 65 | 65 |
| Adhesive force on steel | DIN EN 1939 | 10 min | N/cm | 11 | 10.0 |
| | | 24 h | | 12 | 10.5 |
| Adhesive force on PE | DIN EN 1939 | 10 min | N/cm | 2.5 | 2.5 |
| | | 24 h | | 3.0 | 3.0 |
| Adhesive force on PP | DIN EN 1939 | 10 min | N/cm | 3.5 | 3.0 |
| | | 24 h | | 4.0 | 3.0 |
| Shear strength RT | DIN EN 1943 | 15 min | Min | >10,000 | >10,000 |
| Shear strength at 70° C. | DIN EN 1943 | 15 min | Min | 150 | 350 |

TABLE 6b

Adhesive Forces and Shear Strengths of Adhesive Tapes 1 with Adhesive Films 3 Using Formulations 4b and 4c (High UV-C-Dose)

| Test | Test Method | Dwell Time | Unit | Formulation 3 | Formulation 4a |
|---|---|---|---|---|---|
| Adhesive application | | | g/m² | 60 | 60 |
| UV-C-dosage | | | mJ/cm² | 65 | 65 |
| Adhesive force on steel | DIN EN 1939 | 10 min | N/cm | 10 | 10 |
| | | 24 h | | 12 | 12 |
| Adhesive force on PE | DIN EN 1939 | 10 min | N/cm | 4.0 | 1.0 |
| | | 24 h | | 4.5 | 1.0 |
| Adhesive force on PP | DIN EN 1939 | 10 min | N/cm | 2.5 | 0.5 |
| | | 24 h | | 2.5 | 0.5 |
| Shear strength RT | DIN EN 1943 | 15 min | Min | >10,000 | 5,000 |
| Shear strength at 70° C. | DIN EN 1943 | 15 min | Min | 200 | 50 |

The comparison of the shear strength at 70° C. between formulation 2 and formulations 4b and 4c measured according to DIN EN 1943 again shows a clear shear strength loss as soon as resins are added to the acResin adhesives.

Still further adhesive tapes 1 were finally produced according to the invention with the formulations 5 to 10 for the adhesive films 3 mentioned in Tables 7a and 7b. The application of the adhesive amounted herein also consistently to 60 g/m². A value of 60 mJ/m² was used as UV-C-dosage for crosslinking.

TABLE 7a

UV-Acrylate with Pyrogenic Silicic Acid and Resin (Formulations 5 to 7)

| Formulation Component | Unit | Formulation 5 | Formulation 6 | Formulation 7 |
|---|---|---|---|---|
| AcResin ® 250 | phr | 100 | 100 | 100 |
| Aerosil ® R 972 | phr | 5 | 5 | 5 |
| Escorez 1304 | phr | 5 | 0 | 5 |
| Foral 105 | phr | 0 | 5 | 0 |
| Kristalex F 100 | phr | 0 | 0 | 5 |

TABLE 7b

UV-Acrylate with Pyrogenic Silicic Acid and Resin (Formulations 8 to 10)

| Formulation Component | Unit | Formulation 8 | Formulation 9 | Formulation 10 |
|---|---|---|---|---|
| AcResin ® 260 | phr | 100 | 100 | 100 |
| Aerosil ® R 972 | phr | 5 | 5 | 5 |
| Escorez 1304 | phr | 5 | 0 | 0 |
| Foral 105 | phr | 0 | 5 | 0 |
| Kristalex F 100 | phr | 0 | 0 | 5 |

The adhesive tapes 1 equipped with the adhesive films 3 produced in this way according to the invention achieved the adhesive forces and shear strengths presented in Tables 8a to 8c. The adhesive force on the nonpolar polyolefin surfaces polyethylene (PE) and polypropylene (PP) of the mentioned tables, as well as the exceptionally high shear strength at 70° C. with respect to the values from the comparative examples in Table 2b, should be emphasized herein.

TABLE 8a

Adhesive Forces and Shear Strengths of Adhesive Tapes 1 with Adhesive Films 3 Using Formulations 5 and 6 (High UV-C-Dose)

| Test | Test Method | Dwell Time | Unit | Formulation 5 | Formulation 6 |
|---|---|---|---|---|---|
| Adhesive application | | | g/m² | 60 | 60 |
| UV-C-dosage | | | mJ/cm² | 65 | 65 |
| Adhesive force on steel | DIN EN 1939 | 10 min | N/cm | 12 | 16 |
| | | 24 h | | 12 | 17 |
| Adhesive force on PE | DIN EN 1939 | 10 min | N/cm | 2.0 | 4.0 |
| | | 24 h | | 2.0 | 4.5 |
| Adhesive force on PP | DIN EN 1939 | 10 min | N/cm | 1.0 | 2.0 |
| | | 24 h | | 2.0 | 2.0 |
| Shear strength RT | DIN EN 1943 | 15 min | Min | 2,500 | >10,000 |
| Shear strength at 70° C. | DIN EN 1943 | 15 min | Min | 250 | 200 |

TABLE 8b

Adhesive Forces and Shear Strengths of Adhesive Tapes 1 with Adhesive Films 3 Using Formulations 7 and 8 (High UV-C-Dose)

| Test | Test Method | Dwell Time | Unit | Formulation 7 | Formulation 8 |
|---|---|---|---|---|---|
| Adhesive application | | | g/m² | 60 | 60 |
| UV-C-dosage | | | mJ/cm² | 65 | 65 |
| Adhesive force | DIN EN | 10 min | N/cm | 11.5 | 12 |

TABLE 8b-continued

Adhesive Forces and Shear Strengths of Adhesive Tapes 1 with Adhesive Films 3 Using Formulations 7 and 8 (High UV-C-Dose)

| Test | Test Method | Dwell Time | Unit | Formulation 7 | Formulation 8 |
|---|---|---|---|---|---|
| on steel | 1939 | 24 h | | 13.5 | 12 |
| Adhesive force on PE | DIN EN 1939 | 10 min | N/cm | 1.5 | 2.5 |
| | | 24 h | | 2.0 | 3.5 |
| Adhesive force on PP | DIN EN 1939 | 10 min | N/cm | 0.5 | 2.0 |
| | | 24 h | | 0.5 | 3.0 |
| Shear strength RT | DIN EN 1943 | 15 min | Min | >10,000 | >10,000 |
| Shear strength at 70° C. | DIN EN 1943 | 15 min | Min | >10,000 | >10,000 |

The invention is not restricted to the illustrated exemplary embodiments, but rather encompasses all of the embodiments having an equivalent effect within the scope of the invention as specified in Claims 1 and 10. The invention is furthermore not restricted to the features combinations defined in Claims 1 and 10 as well as the use according to the invention according to Claim 18, but can rather also be defined by means of any other desired combination of specific features of all the disclosed individual features.

TABLE 8c

Adhesive Forces and Shear Strengths of Adhesive Tapes 1 with Adhesive Films 3 Using Formulations 9 and 10 (High UV-C-Dose)

| Test | Test Method | Dwell Time | Unit | Formulation 9 | Formulation 10 |
|---|---|---|---|---|---|
| Adhesive application | | | g/m² | 60 | 60 |
| UV-C-dosage | | | mJ/cm² | 65 | 65 |
| Adhesive force on steel | DIN EN 1939 | 10 min | N/cm | 13.5 | 10.0 |
| | | 24 h | | 15.0 | 12.0 |
| Adhesive force on PE | DIN EN 1939 | 10 min | N/cm | 4.0 | 1.0 |
| | | 24 h | | 4.5 | 1.0 |
| Adhesive force on PP | DIN EN 1939 | 10 min | N/cm | 2.5 | 0.5 |
| | | 24 h | | 2.5 | 0.5 |
| Shear strength RT | DIN EN 1943 | 15 min | Min | >10,000 | >10,000 |
| Shear strength at 70° C. | DIN EN 1943 | 15 min | Min | 1000 | 500 |

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. An adhesive tape for use on nonpolar surfaces and steel, comprising:
   a substrate made of plastic and formed as a film, and
   a self-adhesive, pressure-sensitive adhesive layer on at least one side of the substrate, the adhesive layer consisting of a pressure-sensitive adhesive containing a crosslinked acrylate formed from non-aqueous and solvent-free UV-crosslinkable acrylate containing a photoinitiator incorporated therein by polymerization,
   the pressure sensitive adhesive further containing powdered nanoscale silicon dioxide, which with reference to the UV-crosslinkable acrylate, is within the range of 1 phr to 20 phr, the powered nanoscale silicon dioxide being dispersed in the non-aqueous and solvent free UV-crosslinkable acrylate,
   wherein the self-adhesive pressure-sensitive adhesive layer is applied with a specific surface weight of 20 g/m² to 100 g/m²,
   wherein the pressure-sensitive adhesive is modified by at least one resin selected from the group consisting of:
   a disproportioned, hydrated, polymerized, esterified derivate of pinene, indene, and colophonium resins,
   a salt of pinene, indene, or colophonium resins,
   a terpene resin,
   a terpene phenol resin,
   an aliphatic hydrocarbon resin,
   a C5- to C9-hydrocarbon resin,
   an aromatic hydrocarbon resin, and
   an alkyl aromatic hydrocarbon resin;
   wherein the adhesive layer has a resin content with reference to the UV-crosslinkable acrylate within a range of 2 phr to 10 phr, and
   wherein the adhesive layer is respectively crosslinked with a UV-C-dosage within the range of 5 mJ/cm² to 135 mJ/cm²,
   wherein the pressure-sensitive adhesive layer has an adhesive force on nonpolar surfaces, measured according to DIN EN 1939, of at least 2.0 N/cm, an adhesive force on steel measured according to DIN EN 1939 within the range of 6.0 to 18.0 N/cm, and a shear strength exceeding 1000 minutes at room temperature and at 70° C., after a dwell time of 15 minutes according to DIN EN 1943,
   wherein the UV-crosslinkable acrylate is a prepolymer,
   wherein the UV-crosslinkable acrylate, when determined at 130° C., has a content of non-volatile components of more than 99% by weight over a test period of 30 minutes,
   wherein the UV-crosslinkable acrylate has a K value, determined in accordance with DIN ISO 1628-1 in one percent tetrahydrofuran solution, in the range from 48 to 52.

2. The adhesive tape according to claim 1, wherein the particles of the powdered nanoscale silicone dioxide have an average size within the range of 5 nm to 250 nm.

3. The adhesive tape according to claim 1, wherein the powdered nanoscale silicone dioxide has a BET surface area within the range of 50 m²/g to 500 m²/g.

4. The adhesive tape according to claim 1, wherein the powdered nanoscale silicone dioxide is pyrogenically produced from a chlorosilane or by atomizing quartz sand in an electric arc.

5. The adhesive tape according to claim 1, wherein the powdered nanoscale silicon dioxide is hydrophobized by means of a surface treatment with organosilanes.

6. The adhesive tape according to claim 1, wherein the substrate is made from polyvinylchloride or polyester.

7. The adhesive tape according to claim 1, wherein the substrate has a thickness within the range of 0.005 mm to 0.5 mm.

8. The adhesive tape according to claim 1, wherein the substrate is provided on both sides with the self-adhesive pressure-sensitive adhesive layer.

9. The adhesive tape according to claim 1, wherein at least one of the self-adhesive pressure-sensitive adhesive layer is covered with a siliconized interliner formed by one of a siliconized paper, a siliconized film, and a siliconized polyethylene-coated paper.

10. The adhesive tape according to claim 1, wherein pressure sensitive adhesive is modified with the at least one C5- to C9-hydrocarbon resin.

11. The adhesive tape according to claim 1, wherein the adhesive tape is a double-sided adhesive tape.

12. The adhesive tape according to claim 1, wherein the adhesive force on nonpolar surfaces is the adhesive force on a polyolefin surface.

13. The adhesive tape according to claim 1, wherein the pressure-sensitive adhesive is modified by the at least one C5-to C9-hydrocarbon resin, which is selected from the group consisting of
aliphatic C5 resin,
hydrated colophonium ester resin, and
C8/C9 aromatic hydrocarbon resin.

14. The adhesive tape according to claim 13, wherein a shear strength is exceeding 10000 minutes at room temperature and at 70° C., after a dwell time of 15 minutes according to DIN EN 1943.

15. An adhesive tape for use on nonpolar surfaces and steel, comprising:
a substrate made of plastic and formed as a film, and
a self-adhesive, pressure-sensitive adhesive layer on at least one side of the substrate, the adhesive layer consisting of a pressure-sensitive adhesive containing a crosslinked acrylate formed from non-aqueous and solvent-free UV-crosslinkable acrylate containing a photoinitiator incorporated therein by polymerization,
the pressure sensitive adhesive further containing powdered nanoscale silicon dioxide, which with reference to the UV-crosslinkable acrylate, is within the range of 1 phr to 20 phr, the powered nanoscale silicon dioxide being dispersed in the non-aqueous and solvent free UV-crosslinkable acrylate,
wherein the self-adhesive pressure-sensitive adhesive layer is applied with a specific surface weight of 20 g/m$^2$ to 100 g/m$^2$,
wherein the adhesive layer is respectively crosslinked with a UV-C-dosage within the range of 5 mJ/cm$^2$ to 135 mJ/cm$^2$,
wherein the pressure-sensitive adhesive layer has an adhesive force on nonpolar surfaces, measured according to DIN EN 1939, of at least 2.0 N/cm, an adhesive force on steel measured according to DIN EN 1939 within the range of 6.0 to 18.0 N/cm, and a shear strength exceeding 10,000 minutes at room temperature and at 70° C., after a dwell time of 15 minutes according to DIN EN 1943,
wherein the UV-crosslinkable acrylate is a prepolymer,
wherein the UV-crosslinkable acrylate, when determined at 130° C., has a content of non-volatile components of more than 99% by weight over a test period of 30 minutes,
wherein the UV-crosslinkable acrylate has a K value, determined in accordance with DIN ISO 1628-1 in one percent tetrahydrofuran solution, in the range from 48 to 52.

16. The adhesive tape according to claim 1, wherein the powdered nanoscale silicon dioxide is hydrophilic.

17. An adhesive tape for use on nonpolar surfaces and steel, comprising:
a substrate made of plastic and formed as a film, and
a self-adhesive, pressure-sensitive adhesive layer on at least one side of the substrate, the adhesive layer consisting of a pressure-sensitive adhesive containing a crosslinked acrylate formed from non-aqueous and solvent-free UV-crosslinkable acrylate with a photoinitiator incorporated therein by polymerization,
the pressure sensitive adhesive further containing powdered nanoscale silicon dioxide, which with reference to the UV-crosslinkable acrylate, is within the range of 1 phr to 20 phr, the powered nanoscale silicon dioxide being dispersed in the non-aqueous and solvent free UV-crosslinkable acrylate,
wherein the self-adhesive pressure-sensitive adhesive layer is applied with a specific surface weight of 20 g/m$^2$ to 100 g/m$^2$,
wherein the pressure-sensitive adhesive is modified by at least one resin selected from the group consisting of:
a disproportioned, hydrated, polymerized, esterified derivate of pinene, indene, and colophonium resins,
a salt of pinene, indene, or colophonium resins,
a terpene resin,
a terpene phenol resin,
an aliphatic hydrocarbon resin,
a C5- to C9-hydrocarbon resin,
an aromatic hydrocarbon resin, and
an alkyl aromatic hydrocarbon resin;
wherein the adhesive layer has a resin content with reference to the UV-crosslinkable acrylate within a range of 2 phr to 10 phr, and
wherein the adhesive layer is respectively crosslinked with a UV-C-dosage within the range of 5 mJ/cm$^2$ to 135 mJ/cm$^2$,
wherein the pressure-sensitive adhesive layer has an adhesive force on nonpolar surfaces, measured according to DIN EN 1939, of at least 2.0 N/cm, an adhesive force on steel measured according to DIN EN 1939 within the range of 6.0 to 18.0 N/cm, and a shear strength exceeding 1000 minutes at room temperature and at 70° C., after a dwell time of 15 minutes according to DIN EN 1943,
wherein the powdered nanoscale silicon dioxide is hydrophilic, wherein the UV-crosslinkable acrylate, when determined at 130° C., has a content of non-volatile components of more than 99% by weight over a test period of 30 minutes, wherein the UV-crosslinkable acrylate has a K value, determined in accordance with DIN ISO 1628-1 in one percent tetrahydrofuran solution, in the range from 48 to 52.

* * * * *